G. MOEBS.
Cigar Header.

No. 78,312.

Patented May 26, 1868.

Witnesses:
Thos Fische
W. Trewin

Inventor:
Geo Moebs
Per Munn & Co
Attorneys

United States Patent Office.

GEORGE MOEBS, OF DETROIT, MICHIGAN.

Letters Patent No. 78,312, dated May 26, 1868.

IMPROVED CIGAR-HEADER.

The Schedule referred to in these Letters Patent and making part of the same.

TO ALL WHOM IT MAY CONCERN:

Be it known that I, GEORGE MOEBS, of Detroit, in the county of Wayne, and State of Michigan, have invented a new and improved Device for Heading Cigars; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
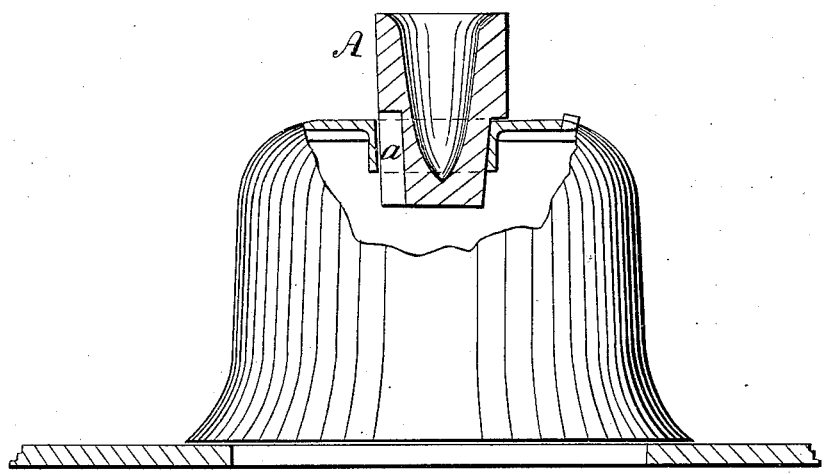
Figure 1 represents my improved cigar-heading device, attached to a cup or heater for use.
Figure 2:
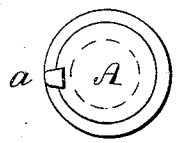
Figure 2 is a bottom view of the same, detached.

The object of this invention is to head a cigar, or roll the wrapper around the end of a cigar, to finish it, instead of doing this work by hand in the ordinary manner.

The device consists in a metal cup, formed to correspond in shape and size with the end required for the head of a cigar.

It is designed to be used in connection with machine-made cigars, where the labor is divided, and all parts of work proceed rapidly; and the heading of the cigars is thus performed more expeditiously than it can be when rolled by hand in the usual way.

A represents a brass or other metal cup, the cavity in which is made in form to correspond with the head of a cigar, as desired, which cup is heated to a moderate temperature, by means of hot water in a vessel in which it is set, as shown in the drawing, the cup being set firmly in the vessel, and prevented from turning round by a rib, $a$, or any suitable arrangement in connection therewith.

The mode of heading a cigar with this device is, as soon as it is made, by rolling the wrapper on the bunch, and the end of the tobacco-leaf is cut or trimmed in proper shape for making the head, and is ground in the usual way, the workman inserts the end of the cigar in the cup A, and, by a dexterous single turn, forms the head.

The cigar is left standing in the cup until another cigar is made, when it is taken out, the heat of the metal in the mean time drying the gum or mucilage employed, and pasting the leaf, so that the head shall retain its shape perfectly.

Having thus described my invention, what I claim as new, and desire to secure by Letters Patent, is—

The metal cup A, for heading cigars, constructed and operating substantially as described.

The above specification of my invention signed by me, this 4th day of October, 1867.

GEORGE MOEBS.

Witnesses:
WM. F. MCNAMARA,
ALEX. F. ROBERTS.